United States Patent
Sakamoto et al.

(10) Patent No.: US 8,174,310 B2
(45) Date of Patent: May 8, 2012

(54) QUADRATURE MODULATION DEMODULATION CIRCUIT

(75) Inventors: Shingo Sakamoto, Yokohama (JP); Kotaro Murakami, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 99 days.

(21) Appl. No.: 12/861,818

(22) Filed: Aug. 23, 2010

(65) Prior Publication Data

US 2011/0043277 A1 Feb. 24, 2011

(30) Foreign Application Priority Data

Aug. 24, 2009 (JP) .................. 2009-192871

(51) Int. Cl.
*H03C 1/00* (2006.01)
*H03C 3/00* (2006.01)
*H03D 1/00* (2006.01)
*H03D 3/00* (2006.01)

(52) U.S. Cl. ........ 329/302; 329/306; 329/346; 329/358; 332/100; 332/103; 332/117; 332/144; 332/149; 455/313

(58) Field of Classification Search .................. 329/304, 329/306–309, 345–347, 358–362; 331/37, 331/38; 332/100, 103, 117, 144, 149; 455/313, 455/323

See application file for complete search history.

(56) References Cited

U.S. PATENT DOCUMENTS

| | | | | |
|---|---|---|---|---|
| 5,541,606 A | * | 7/1996 | Lennen | 342/357.77 |
| 6,310,513 B1 | * | 10/2001 | Iemura | 329/304 |
| 6,711,397 B1 | * | 3/2004 | Petrov et al. | 455/324 |
| 7,542,521 B2 | * | 6/2009 | Choi et al. | 375/316 |
| 7,826,814 B2 | * | 11/2010 | Masuda | 455/258 |

OTHER PUBLICATIONS

Lee, Thomas H. "The Design of CMOS Radio-Frequency Integrated Circuits Second Edition", pp. 56-61, 2004, Jan. 1, 2004.

* cited by examiner

*Primary Examiner* — David Mis
(74) *Attorney, Agent, or Firm* — Fujitsu Patent Center

(57) ABSTRACT

A quadrature demodulation circuit includes: first to fourth mixers to receive a modulation signal; a phase shifter to supply to the first and third mixers a first local frequency signal, to supply to the second mixer a second local frequency signal having a designated phase difference relative to the first local frequency signal, and to supply to the fourth mixer a third local frequency signal that is an inverse in phase to the second local frequency signal; a first adder to add a signal output from the first mixer and a signal output from the second mixer and to output a first demodulation signal; and a second adder to add a signal output from the third mixer and a signal output from the fourth mixer and to output a second demodulation signal.

19 Claims, 12 Drawing Sheets

US 8,174,310 B2

QUADRATURE MODULATION DEMODULATION CIRCUIT

CROSS-REFERENCE TO RELATED APPLICATIONS

This application claims the benefit of priority from Japanese Patent Application No. 2009-192871 filed on Aug. 24, 2009, the entire contents of which are incorporated herein by reference.

BACKGROUND

1. Field

Embodiments discussed herein relate to a quadrature modulation demodulation circuit.

2. Description of Related Art

A quadrature modulation circuit included in a quadrature modulation-demodulation circuit multiplies I signal and Q signal by local frequency signals which have phases shifted from each other by 90 degrees, respectively, and adds the resultant multiplied signals so as to generate a modulation wave output. There is also a quadrature demodulation circuit that multiplies a modulation wave input including I and Q signals by each of local frequency signals having phases shifted from each other by 90 degrees so as to generate demodulation wave outputs of the I and Q signals in a baseband or an intermediate frequency band.

Related art is discussed, for example, in non-patent document "The Design of CMOS Radio-Frequency Integrated Circuits" Second Edition, Thomas H. Lee, FIG. 2.11, Page 61.

SUMMARY

According to one aspect of the embodiments, a quadrature demodulation circuit includes: first to fourth mixers to receive a modulation signal; a phase shifter to supply to the first and third mixers a first local frequency signal, to supply to the second mixer a second local frequency signal having a designated phase difference relative to the first local frequency signal, and to supply to the fourth mixer a third local frequency signal that is an inverse in phase to the second local frequency signal; a first adder to add a signal output from the first mixer and a signal output from the second mixer and to output a first demodulation signal; and a second adder to add a signal output from the third mixer and a signal output from the fourth mixer and to output a second demodulation signal.

The object and advantages of the invention will be realized and achieved by at least the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

When a phase difference between local frequency signals generated by a phase shifter is shifted from 90 degrees, a quadrature modulation circuit may not properly demodulate a modulation signal.

Further, when a frequency of a local frequency signal becomes high, frequency characteristics of a mixer serving as a multiplier may vary and a demodulation error may occur.

Figure 1:
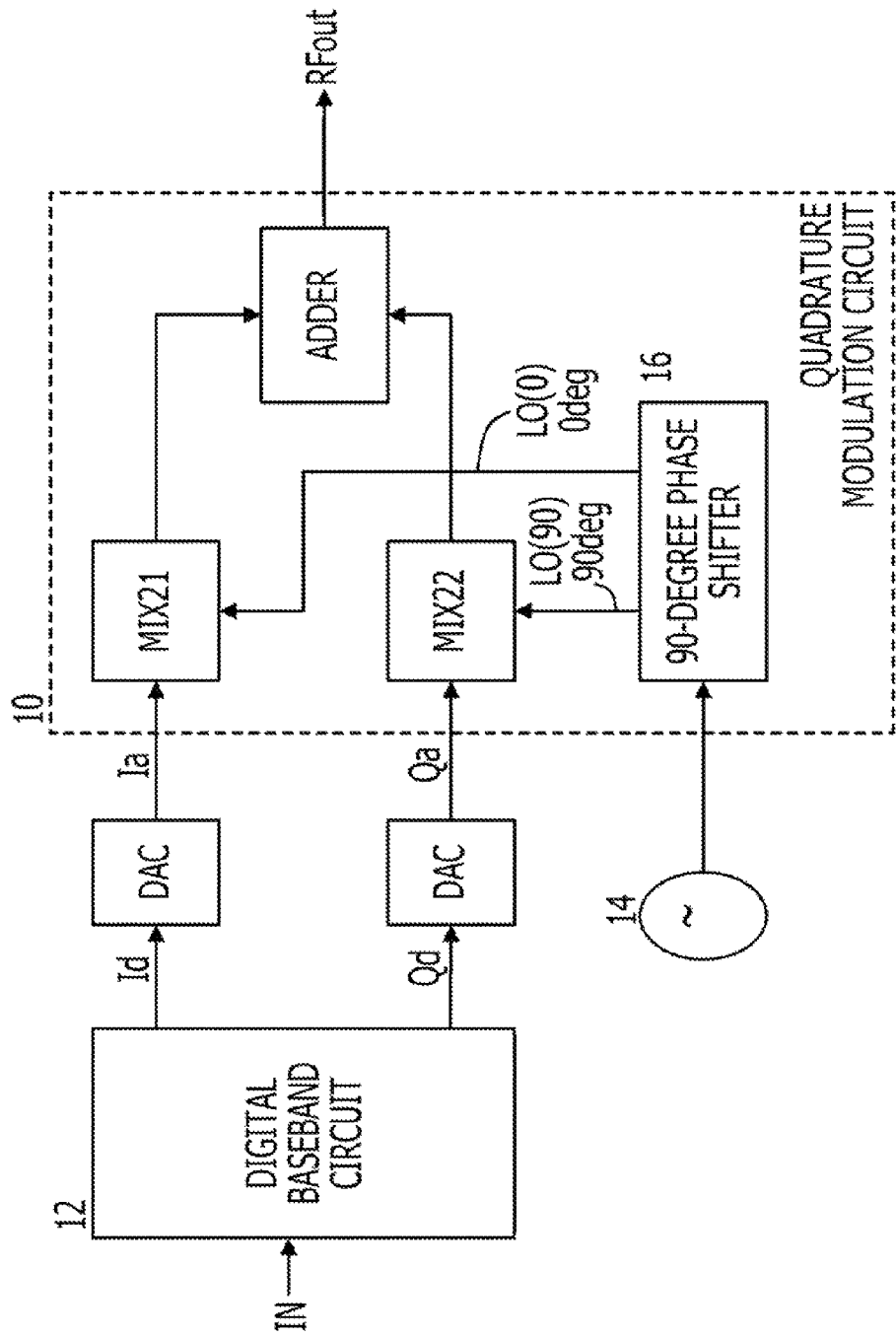
FIG. 1 illustrates an exemplary transmission circuit.

FIG. 1 illustrates an exemplary transmission circuit. The transmission circuit includes a digital baseband circuit 12, first and second digital/analog converters DAC, and a quadrature demodulation circuit 10. The digital baseband circuit 12 encodes input data IN to be transmitted and performs mapping so as to output an encoded I signal Id and an encoded Q signal Qd which have been mapped on encoding points in an orthogonal coordinate having I and Q axes. The first and second digital/analog converters DAC convert the I signal Id and the Q signal Qd which are digital signals into an I signal Ia and a Q signal Qa, respectively, which are analog baseband signals. The quadrature demodulation circuit 10 performs quadrature modulation on the I signal Ia and the Q signal Qa.

The quadrature demodulation circuit 10 includes a phase shifter 16, first and second mixers (multipliers) MIX21 and MIX22, and an adder. The phase shifter 16 generates local frequency signals LO(0) and LO(90), which are sine waves or rectangular waves and have phases shifted from each other by 90 degrees, based on a signal of a local frequency which is generated by an oscillator 14. The first and second mixers (multipliers) MIX21 and MIX22 multiplies the I signal Ia and the Q signal Qa by the local frequency signals LO(0) and LO(90), respectively. The adder adds signals output from the first and second mixers MIX21 and MIX22 to each other and outputs a high-frequency modulation output RFout.

When a phase difference between the local frequency signals LO(0) and LO(90) is shifted away from 90 degrees, phases and amplitudes at encoding points in constellation of the output RFout obtained by the quadrature modulation may be different from desired phases and amplitudes.

Figure 2:
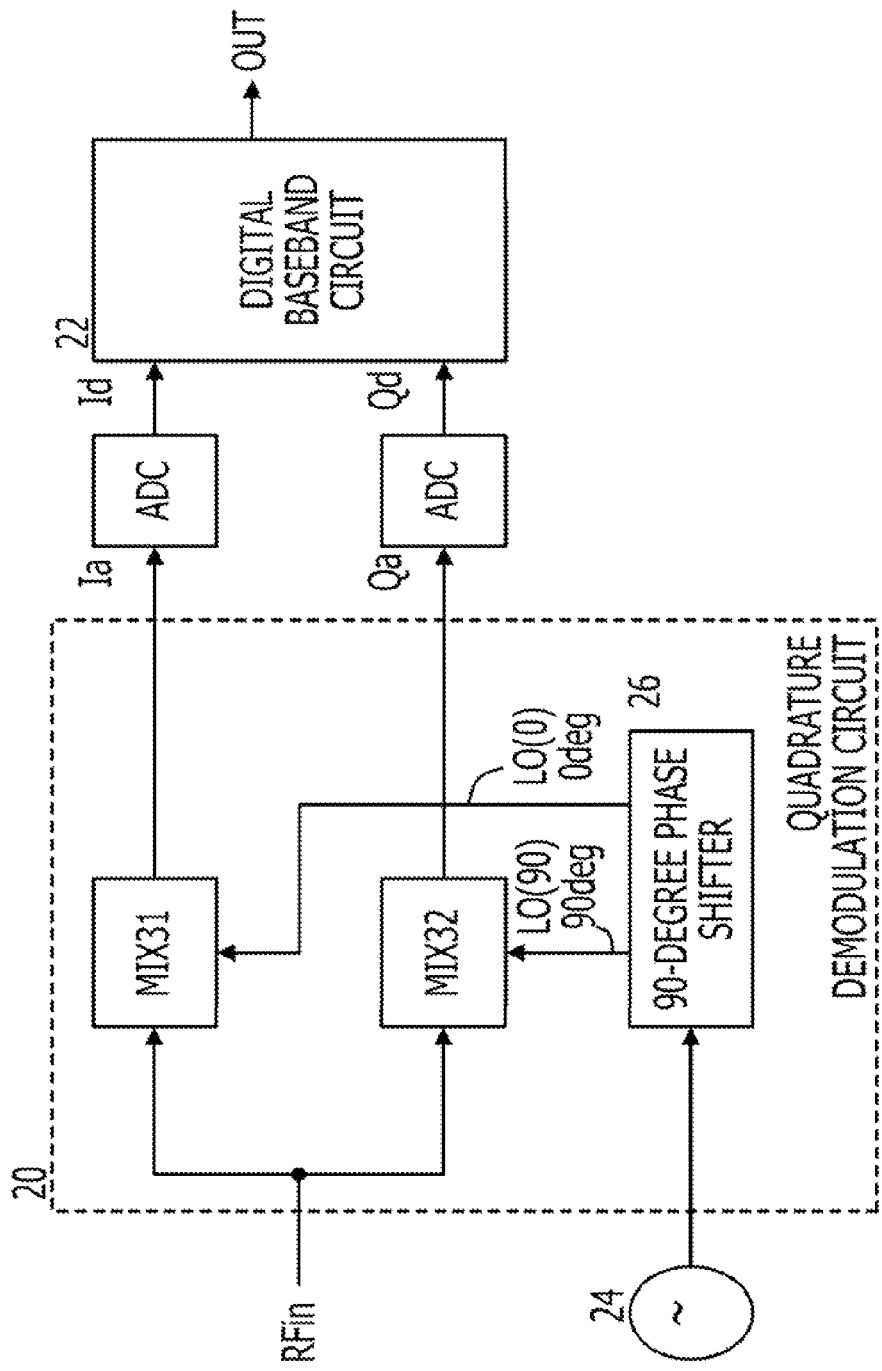
FIG. 2 illustrates an exemplary reception circuit.

FIG. 2 illustrates an exemplary reception circuit. The reception circuit includes a quadrature demodulation circuit 20, first and second analog/digital converters ADC, and a digital baseband circuit 22. The quadrature demodulation circuit 20 performs quadrature demodulation on a received modulation wave input RFin so as to extract an I signal Ia and a Q signal Qa which are analog baseband signals. The first and second analog/digital converters ADC convert the analog baseband signals into digital signals. The digital baseband circuit 22 performs demapping or decoding on the I signal Id and the Q signal Qd which are digital signals and outputs reception data OUT.

The quadrature demodulation circuit 20 includes a phase shifter 26 and first and second mixers (multipliers) MIX31 and MIX32. The phase shifter 26 generates local frequency signals LO(0) and LO(90), which have phases shifted from each other by 90 degrees, based on a signal generated by an oscillator 24. The first and second mixers (multipliers) MIX31 and MIX32 multiplies the frequency wave input RFin by local frequency signals LO(0) and LO(90), respectively, which are generated by the phase shifter 26.

The quadrature demodulation circuit 20 may not appropriately perform the quadrature demodulation on the modulation wave input RFin when a phase difference between the local frequency signals LO(0) and LO(90) generated by the phase shifter 26 is shifted from 90 degrees.

Figure 3:
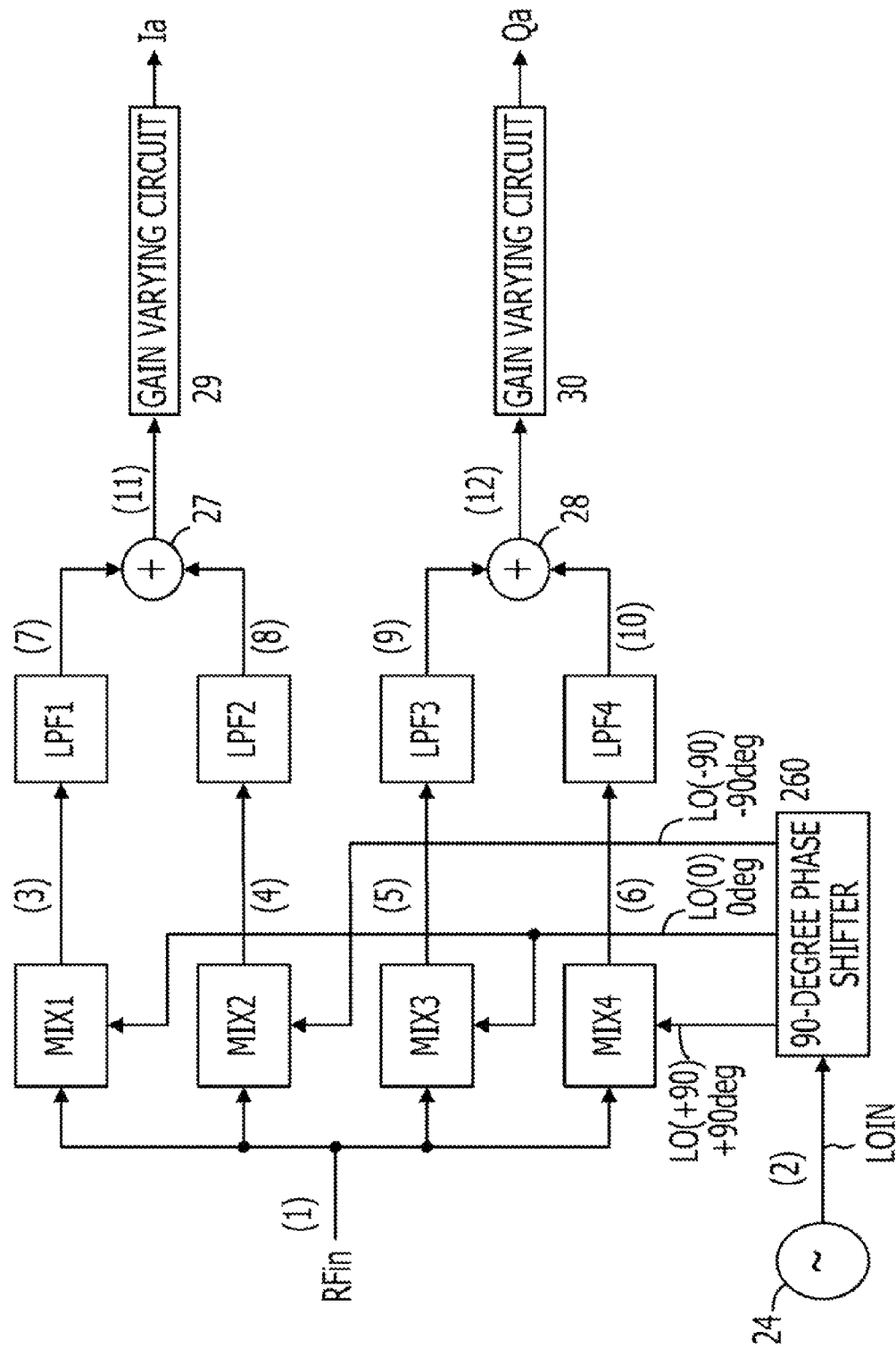
FIG. 3 illustrates an exemplary quadrature demodulation circuit.

FIG. 3 illustrates an exemplary quadrature demodulation circuit 20 that may be used, for example, in a signal reception device or circuit. The quadrature demodulation circuit 20 includes first to fourth mixers MIX1 to MIX4, a phase shifter 260, and first and second adders 27 and 28. A high-frequency modulation signal RFin is input to the first to fourth mixers MIX1 to MIX4. The phase shifter 260 supplies a first local frequency signal LO(0) to the first and third mixers MIX1 and MIX3, supplies a second local frequency signal LO(−90) having a certain phase difference relative to the first local frequency signal LO(0) to the second mixer MIX2, and supplies a third local frequency signal LO(+90) obtained by inverting the second local frequency signal to the fourth mixer MIX4. The first adder 27 adds a signal output from the first mixer MIX1 and a signal output from the second mixer MIX2 to each other and outputs a first demodulation signal. The second adder adds a signal output from the third mixer MIX3 and a signal output from the fourth mixer MIX4 and outputs a second demodulation signal.

First to fourth low-pass filters LPF1 to LPF4 are disposed on output sides of multipliers, for example, the first to fourth mixers MIX1 to MIX4. Gain varying circuits 29 and 30 are disposed so as to control gains of signals output from the first and second adder 27 and 28, respectively.

The phase shifter 260 shifts a phase of a signal having the local frequency of the oscillator 24 so as to generate the first local frequency signal LO(0) having a phase difference of 0 degree, the second local frequency signal LO(−90) having a phase difference of −90 degrees, and the third local frequency signal LO(+90) having a phase difference of +90 degrees. In the phase shifter 260, a phase difference by ±90 degrees may not affect to phases of the demodulation signals Ia and Qa. When a phase difference of a signal output from the phase shifter 260 is shifted from 90 degrees, the second local frequency signal LO(−90) and the third local frequency signal LO(+90), which are generated by the phase shifter 260, may have certain phase differences relative to a phase of the first local frequency signal LO(0) by certain degrees other than 90 degrees.

For example, a high-frequency modulation signal RFin (1) may correspond to $A\cos(\omega_{RF} t+\theta)$ and a signal output from the oscillator 24, for example, a signal (2) input to the phase shifter 260 may correspond to $\cos(\omega_{LO} t)$. The signals LO(0) and LO(−90) and the signals LO(0) and LO(+90) output from the phase shifter 260 may have phase differences by −90 degrees and +90 degrees, respectively, which have not been shifted. Signals (3) and (5) output from the first and third MIX1 and MIX3 may correspond to $A\cos(\omega_{RF} t+\theta)\times\cos(\omega_{LO} t)$. A signal (4) output from the second mixer MIX2 may correspond to $A\cos(\omega_{RF} t+\theta)\times\cos(\omega_{LO} t-\pi/2)$. A signal (6) output from the fourth mixer MIX4 may correspond to $A\cos(\omega_{RF} t+\theta)\times\cos(\omega_{LO} t+\pi/2)$.

The first to fourth low-pass filters LPF1 to LPF 4 extract baseband components from the signals which are output from the first to fourth mixers MIX1 to MIX4 after product-sum operation. Signals (7) and (9) output from the first and third low-pass filters LPF1 and LPF3 may correspond to $A/2\times\cos((\omega_{RF}-\omega_{LO})t+\theta)$. A signal (8) output from the second low-pass filter LPF2 may correspond to $A/2\times\cos((\omega_{RF}-\omega_{LO})t+\theta+\pi/2)$. A signal (10) output from the fourth low-pass filter LPF4 may correspond to $A/2\times\cos((\omega_{RF}-\omega_{LO}) t+\theta-\pi/2)$.

The first adder 27 which adds the signals (7) and (8) to each other outputs an I-side demodulation signal (11). The I-side demodulation signal (11) is represented by the following equation.

$$A/2\times\cos((\omega_{RF}-\omega_{LO})t+\theta)+A/2\times\cos((\omega_{RF}-\omega_{LO})t+\theta+\pi/2)\\=A\cos((\omega_{RF}-\omega_{LO})t+\theta+\pi/4)\times\cos(-\pi/4)=A/\sqrt{2}\times\cos((\omega_{RF}-\omega_{LO})t+\theta+\pi/4)$$

The second adder 28 which adds the signals (9) and (10) to each other outputs a Q-side demodulation signal (12). The Q-side demodulation signal (12) is represented by the following equation.

$$A/2\times\cos((\omega_{RF}-\omega_{LO})t+\theta)+A/2\times\cos((\omega_{RF}-\omega_{LO})t+\theta-\pi/2)=A\cos((\omega_{RF}-\omega_{LO})t+\theta-\pi/4)\times\cos(\pi/4)=A/(\sqrt{2})\times\cos((\omega_{RF}-\omega_{LO})t+\theta-\pi/4)$$

Figure 4A:
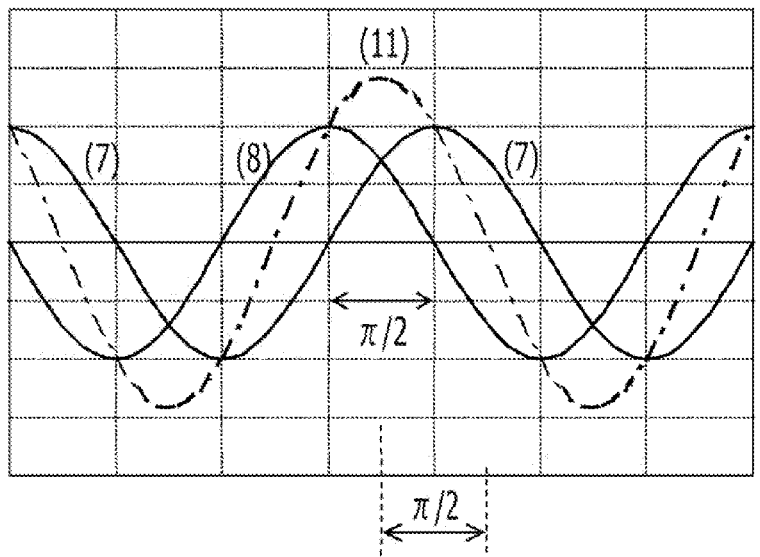
FIGS. 4A and 4B illustrate an exemplary signal of a quadrature demodulation circuit.
Figure 4B:
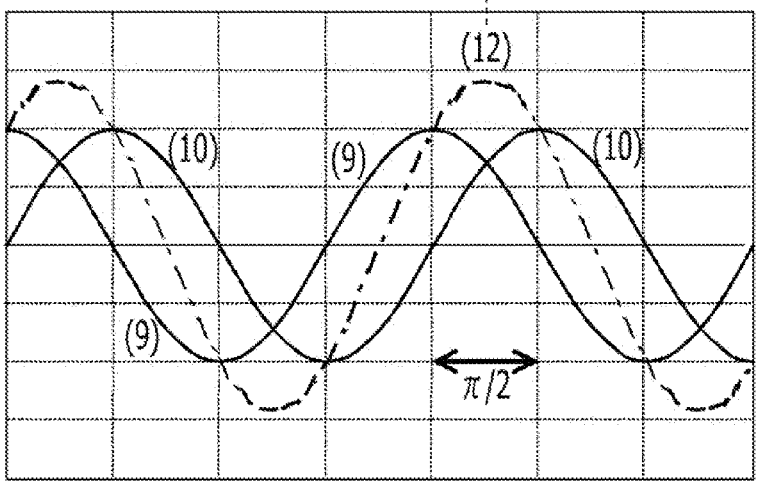

FIGS. 4A, 4B, 5A, 5B, 5C, and 6 illustrate exemplary signal waveforms of a quadrature demodulation circuit. FIG. 4A illustrates waveforms of the signal (7) output from the first low-pass filter LPF1, the signal (8) output from the second low-pass filter LPF2, and the signal (11) output from the first adder 27. The signals (7) and (8) have phases different from each other by $\pi/2$. The signal (11) output from the first adder 27 which adds the output signals (7) and (8) to each other has a phase corresponding to the middle of the phases of the output signals (7) and (8). FIG. 4B illustrates waveforms of the signal (9) output from the third low-pass filter LPF3, the signal (10) output from the fourth low-pass filter LPF4, and the signal (12) output from the second adder 28. The signals (9) and (10) have phases different from each other by $\pi/2$. The signal (12) output from the second adder 28 which adds the output signals (9) and (10) to each other has a phase corresponding to the middle of the phases of the output signals (9) and (10). The I-side demodulation signal (11) and the Q-side demodulation signal (12) have substantially the same amplitude $A/\sqrt{2}$) and have phases different from each other by $\pi/2$ (90 degrees).

Phases of signals output from the phase shifter 260 may be shifted by $\alpha$. The +90-degree signal LO(+90) output from the phase shifter 260 may correspond to $\cos(\omega_{LO} t+\pi/2+\alpha)$. The −90-degree signal LO(−90) output from the phase shifter 260 may correspond to $\cos(\omega_{LO} t-\pi/2+\alpha)$.

The I-side demodulation signal (11) is represented as follows.

$$A/2\times\cos((\omega_{RF}-\omega_{LO})t+\theta)+A/2\times\cos((\omega_{RF}-\omega_{LO})t+\theta+\pi/2-\alpha)=A\cos((\omega_{RF}-\omega_{LO})t+\theta+\pi/4-\alpha/2)\times\cos(-\pi/4+\alpha/2)=Ai\cos((\omega_{RF}-\omega_{LO})t+\theta+\pi/4-\alpha/2)$$

The amplitude Ai may correspond to $A\cos(-\pi/4+\alpha/2)$ and may be a certain number.

The Q-side demodulation signal (12) is expressed as follows.

$$A/2\times\cos((\omega RF-\omega LO)t+\theta)+A/2\times\cos((\omega RF-LO)t+\theta-\pi/2-\alpha)=A\cos((\omega RF-\omega LO)t+\theta-\pi/4-\alpha/2)\times\cos(\pi/4+\alpha/2)=Aq\cos((\omega RF-\omega LO)t+\theta-\pi/4-\alpha/2)$$

The amplitude Aq may correspond to $A\cos(\pi/4+\alpha/2)$ and may be a constant number.

Figure 5A:
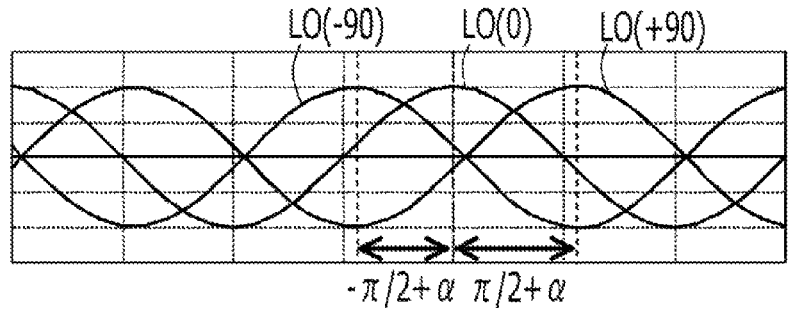
FIGS. 5A to 5C illustrate an exemplary signal of a quadrature demodulation circuit.
Figure 5B:
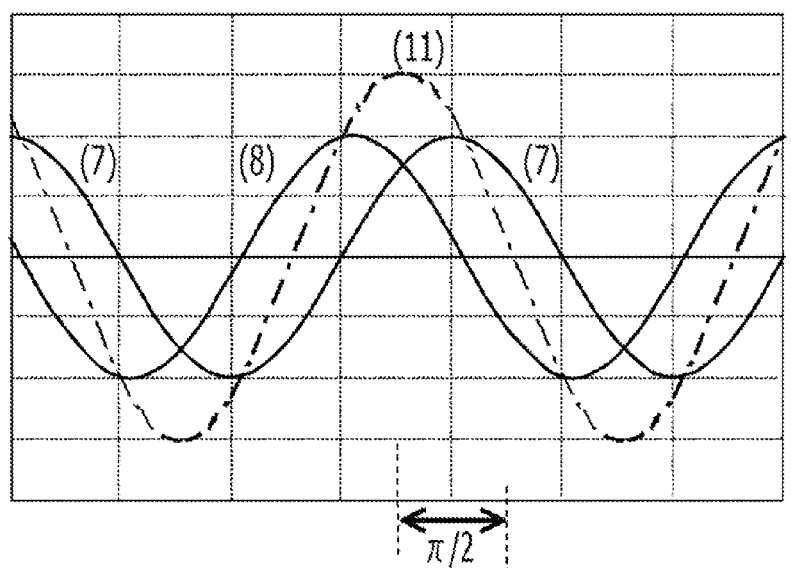
Figure 5C:
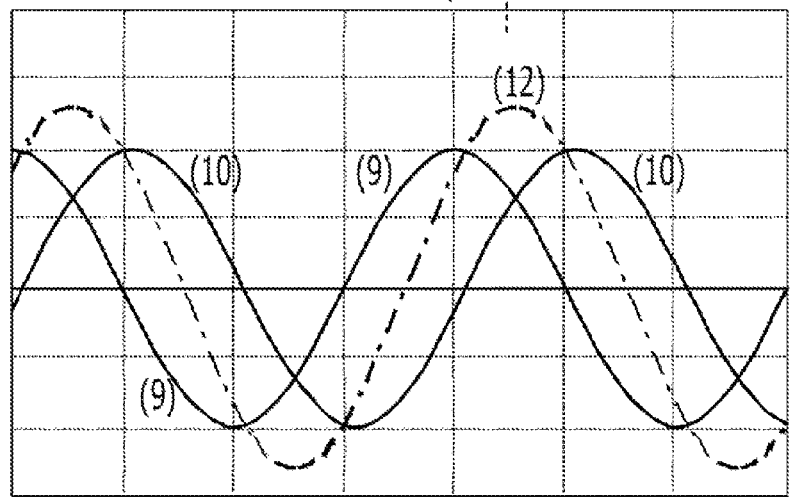
Figure 6:
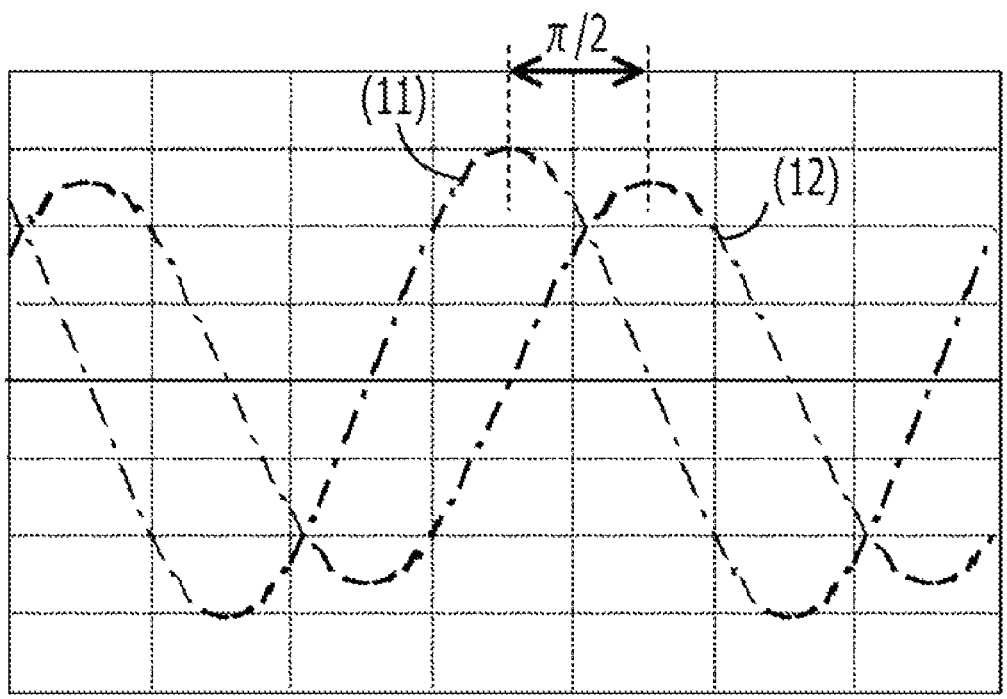
FIG. 6 illustrates an signal of a quadrature demodulation circuit.

FIGS. 5A to 5C illustrate exemplary signals. The signals illustrated in FIG. 5 may have phase shifts of $\alpha$. FIG. 5A illustrates the signals LO(0), LO(−90), and LO(+90) output from the phase shifter 260. The signals illustrated in FIG. 5A have phase shifts of a relative to +90 degrees to −90 degrees. FIG. 5B illustrates the signals (7) and (8) output from the first and second low-pass filters LPF1 and LPF2 and the I-side demodulation signal (11). FIG. 5C illustrates the signals (9) and (10) output from the third and fourth low-pass filters LPF3 and LPF4 and the Q-side demodulation signal (12).

The phase of the I-side demodulation signal (11) and the phase of the Q-side demodulation signal (12) may be shifted from each other by $-\alpha/2$ in the same direction. The phase shift a of the phase shifter 260 is cancelled and a phase difference between the I-side demodulation signal (11) and the Q-side demodulation signal (12) becomes $\pi/2$ (90 degrees). Since the amplitude Ai of the I-side demodulation signal (11) and the amplitude Aq of the Q-side demodulation signal (12) are different from each other, the amplitude Ai of the I-side demodulation signal (11) and the amplitude Aq of the Q-side demodulation signal (12) may be corrected. For example, the gain varying circuits 29 and 30 illustrated in FIG. 3 may correct. The amplitudes include a phase shift component $\alpha/2$. The gain varying circuits 29 and 30 may correct so that the amplitudes of the I-side demodulation signal (11) and the Q-side demodulation signal (12) become substantially equal to each other.

In FIG. 3, when an angular frequency ($\omega_{RF}$ t of the modulation input signal RFin is substantially equal to an angular frequency $\omega_{LO}$ t of the signal (2) output from the oscillator 24, the I-side demodulation signal (11) and the Q-side demodulation signal (12) may be baseband signals. When the angular frequency (ORF t of the modulation input signal RFin is not substantially equal to the angular frequency $\omega_{LO}$ t of the signal (2) output from the oscillator 24, the I-side demodulation signal (11) and the Q-side demodulation signal (12) may be intermediate frequency signals corresponding to ($\omega_{RF}$ t-$\omega_{LO}$ t). In the I-side demodulation signal (11) and the Q-side demodulation signal (12), the phase shift of a of the phase shifter 260 may be cancelled.

Figure 7:
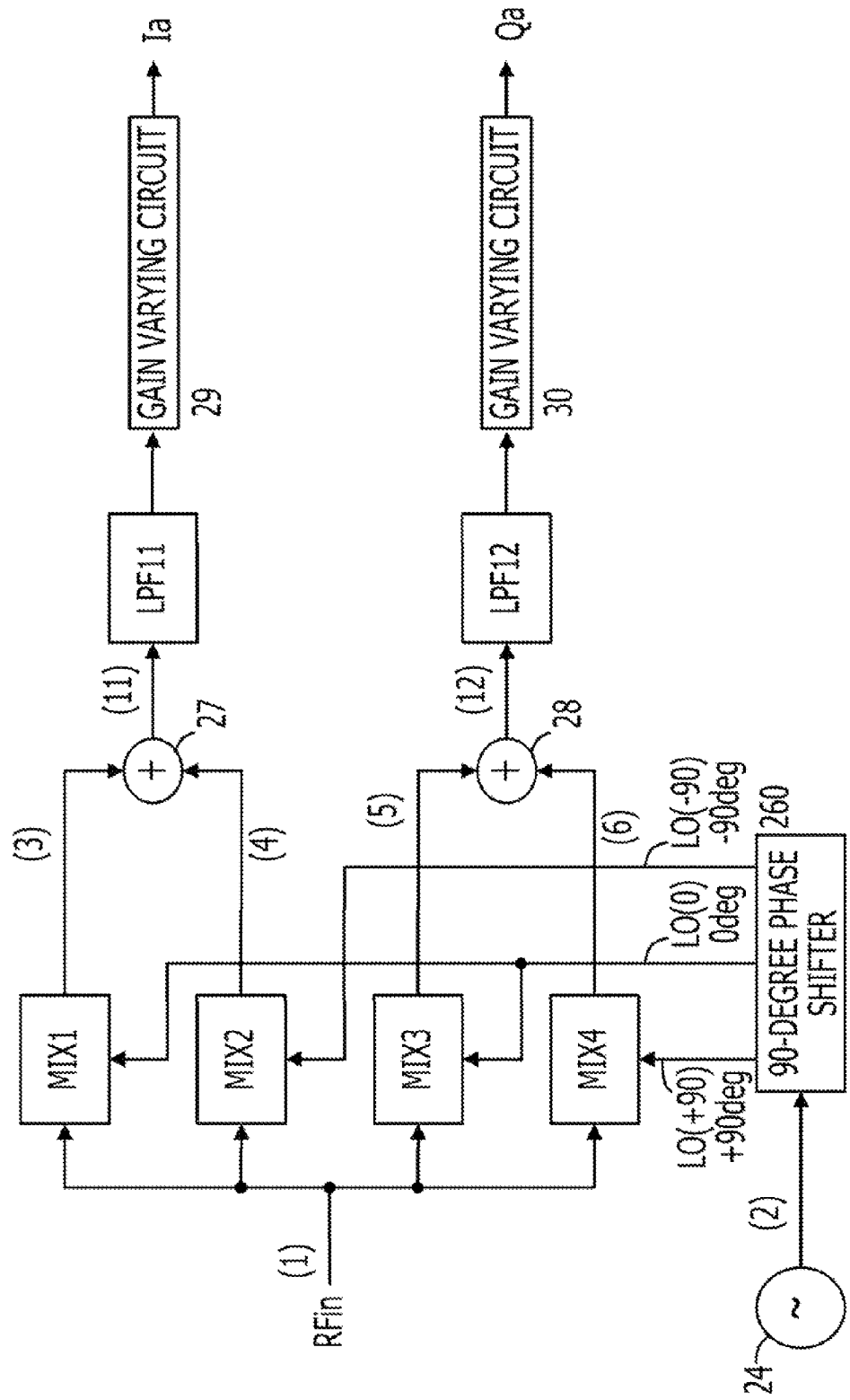
FIG. 7 illustrates an exemplary quadrature demodulation circuit.

FIG. 7 illustrates an exemplary quadrature demodulation circuit. The quadrature demodulation circuit illustrated in FIG. 7 includes first to fourth mixers MIX1 to MIX4, a phase shifter 260, and first and second adders 27 and 28. A high-frequency modulation signal RFin is supplied to the first to fourth mixers MIX1 to MIX4. The phase shifter 260 supplies a first local frequency signal LO(0) to the first and third mixers MIX1 and MIX3, supplies a second local frequency signal LO(−90) having a predetermined phase difference relative to the first local frequency signal LO(0) to the second mixer MIX2, and supplies a third local frequency signal LO(+90) obtained by inverting the second local frequency signal LO(−90) to the fourth mixer MIX4. The first adder 27 adds a signal output from the first mixer MIX1 to a signal output from the second mixer MIX2 and outputs a first demodulation signal. The second adder 28 adds a signal output from the third mixer MIX3 to a signal output from the fourth mixer MIX4 and outputs a second demodulation signal. The quadrature modulation circuit illustrated in FIG. 7 further includes gain varying circuits 29 and 30 which adjust amplitude.

First and second low-pass filters LPF11 and LPF12 are disposed on output sides of the first and second adders 27 and 28 instead of output sides of the first to fourth mixers MIX1 to MIX4. Other components may be substantially the same as or similar to the components illustrated in FIG. 3.

Figure 8:
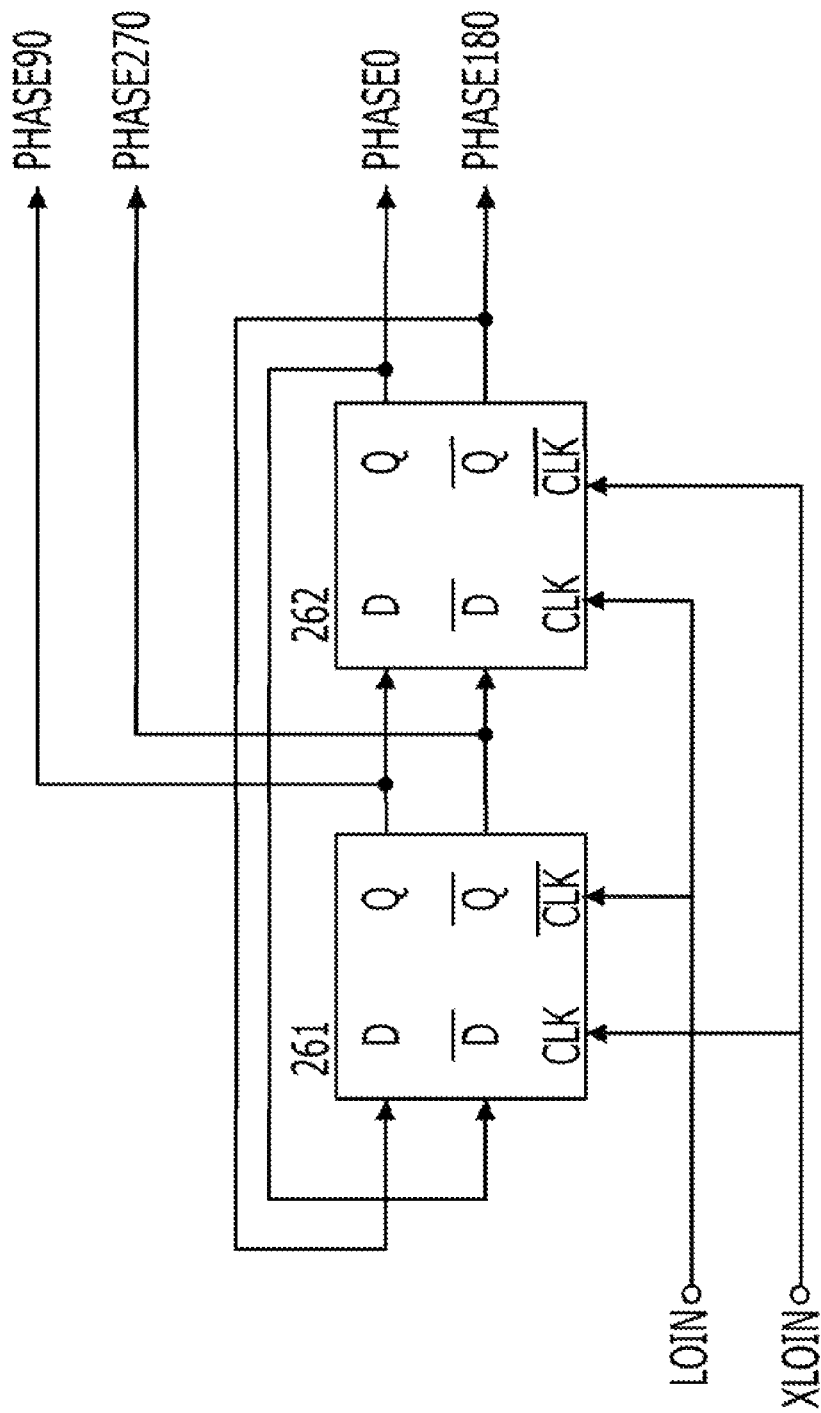
FIG. 8 illustrates an exemplary phase shifter.
Figure 9:
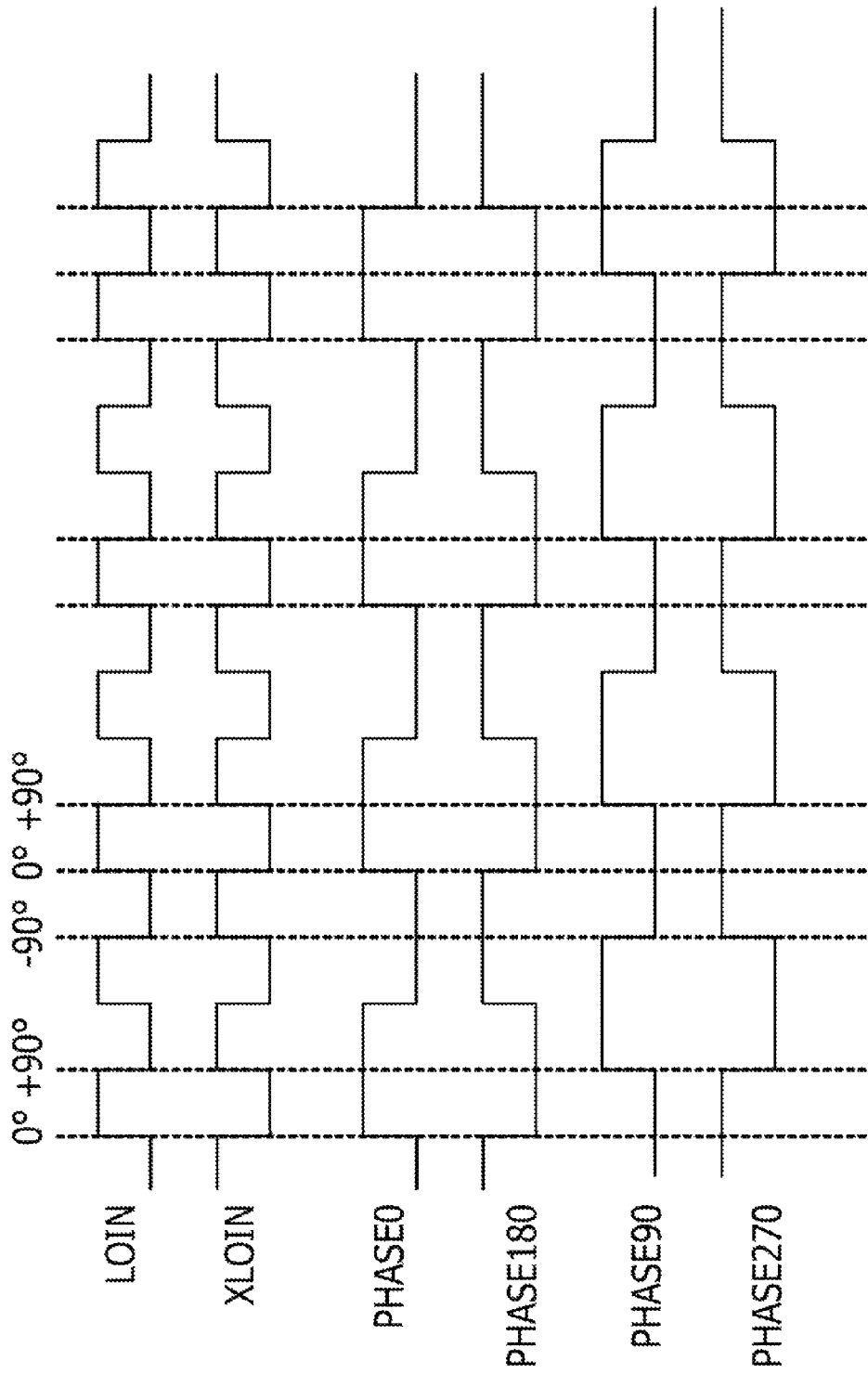
FIG. 9 illustrates an signal of a demodulation circuit.

FIG. 8 illustrates an exemplary phase shifter. FIG. 9 illustrates exemplary waveforms of a phase shifter. The waveforms illustrated in FIG. 9 may correspond to waveforms of the phase shifter 260 illustrated in FIG. 8. The phase shifter 260 illustrated in FIG. 8 includes two flip-flop circuits 261 and 262. The phase shifter 260 may be a differential phase shifter. Signals LOIN and XLOIN, which are supplied from an oscillator and have different phases, are supplied to clock terminals CLK and /CLK of the flip-flop circuits 261 and 262 in an inverse manner. Output terminals Q and /Q of the flip-flop circuit 261 are coupled to input terminals D and /D of the flip-flop circuit 262, respectively. Output terminals Q and /Q of the flip-flop circuit 262 are coupled to input terminals/D and D of the flip-flop circuit 261, respectively, in an inverse manner. In response to rising edges of the signals LOIN and XLOIN input to the clock terminals CLK and /CLK, the flip-flop circuits 261 and 262 obtain data input D and data input/D and output data output Q and /Q.

As illustrated in FIG. 9, the flip-flop circuit 262 arranged in the latter stage outputs signals phase0 and phase180 which are obtained by dividing the input signals LOIN and XLOIN by 2. The flip-flop circuit 261 outputs signals phase90 and phase270 which are shifted from the phase0 and phase180 by ±90 degrees. The signal phase0 may correspond to the local frequency signal LO(0) illustrated in FIG. 3, the signals phase90 and phase270 may correspond to the local frequency signals LO(+90) and LO(−90), respectively, illustrated in FIG. 3. In the phase shifter 260 including a divider circuit, the output signals phase 90 and phase 270 may be generated by the flip-flop circuit 261 and may have substantially the same phase shift $\alpha$.

Figure 10:
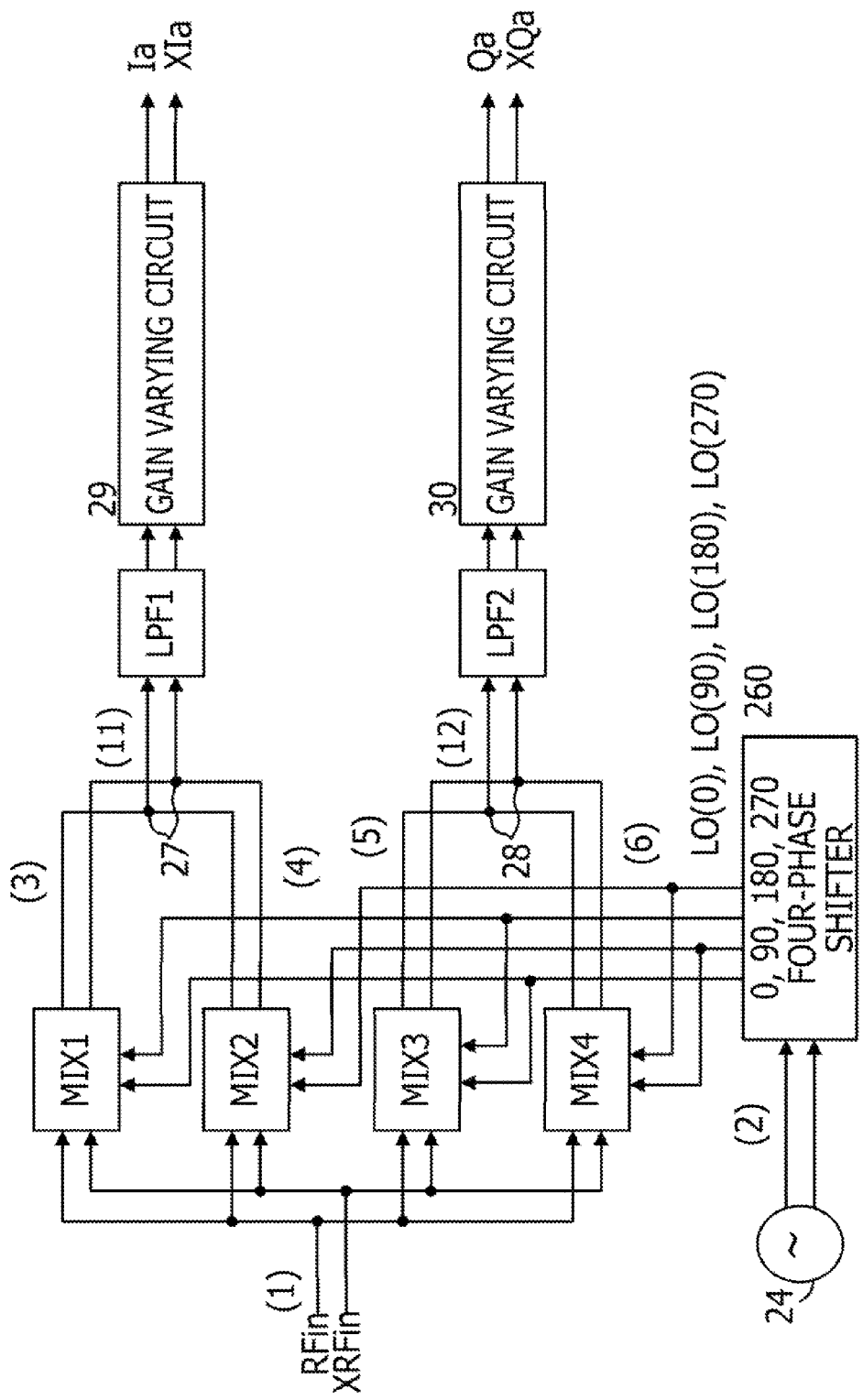
FIG. 10 illustrates an exemplary quadrature demodulation circuit.

FIG. 10 illustrates an exemplary quadrature demodulation circuit. The quadrature demodulation circuit illustrated in FIG. 10 may include a differential circuit. First to fourth mixers MIX1 to MIX4 serving as multipliers may include double balanced mixers. A four-phase shifter 260 generates a local frequency signal LO(0), LO(90), LO(180), or LO(270) having a phase difference of 0 degree, 90 degrees, 180 degrees, or 270 degrees. The four-phase shifter may correspond to the divider circuit illustrated in FIG. 8.

The four-phase shifter 260 supplies the local frequency signal LO(0) having the phase difference of 0 degree or the local frequency signal LO(180) having the phase difference of 180 degrees to the first and third mixers MIX1 and MIX3. The four-phase shifter 260 supplies the local frequency signal LO(90) having the phase difference of 90 degrees or the local frequency signal LO(270) having the phase difference of 270 degrees to the second mixer MIX2. The four-phase shifter 260 supplies the local frequency signal LO(270) having the phase difference of 270 degrees or the local frequency signal LO(90) having the phase difference of 90 degrees to the mixer MIX4.

A signal obtained by synthesizing signals output from the first and second mixers MIX1 and MIX2 and a signal obtained by synthesizing signals output from the third and fourth mixers MIX3 and MIX4 are supplied to low-pass filters LPF1 and LPF2 and gain varying circuits 29 and 30, respectively, and I/Q modulation signals Ia and XIa and I/Q modulation signals Qa and XQa, which have reduced phase difference and reduced amplitude difference, are generated. First and second adders 27 and 28 include wired ORs.

Figure 11:
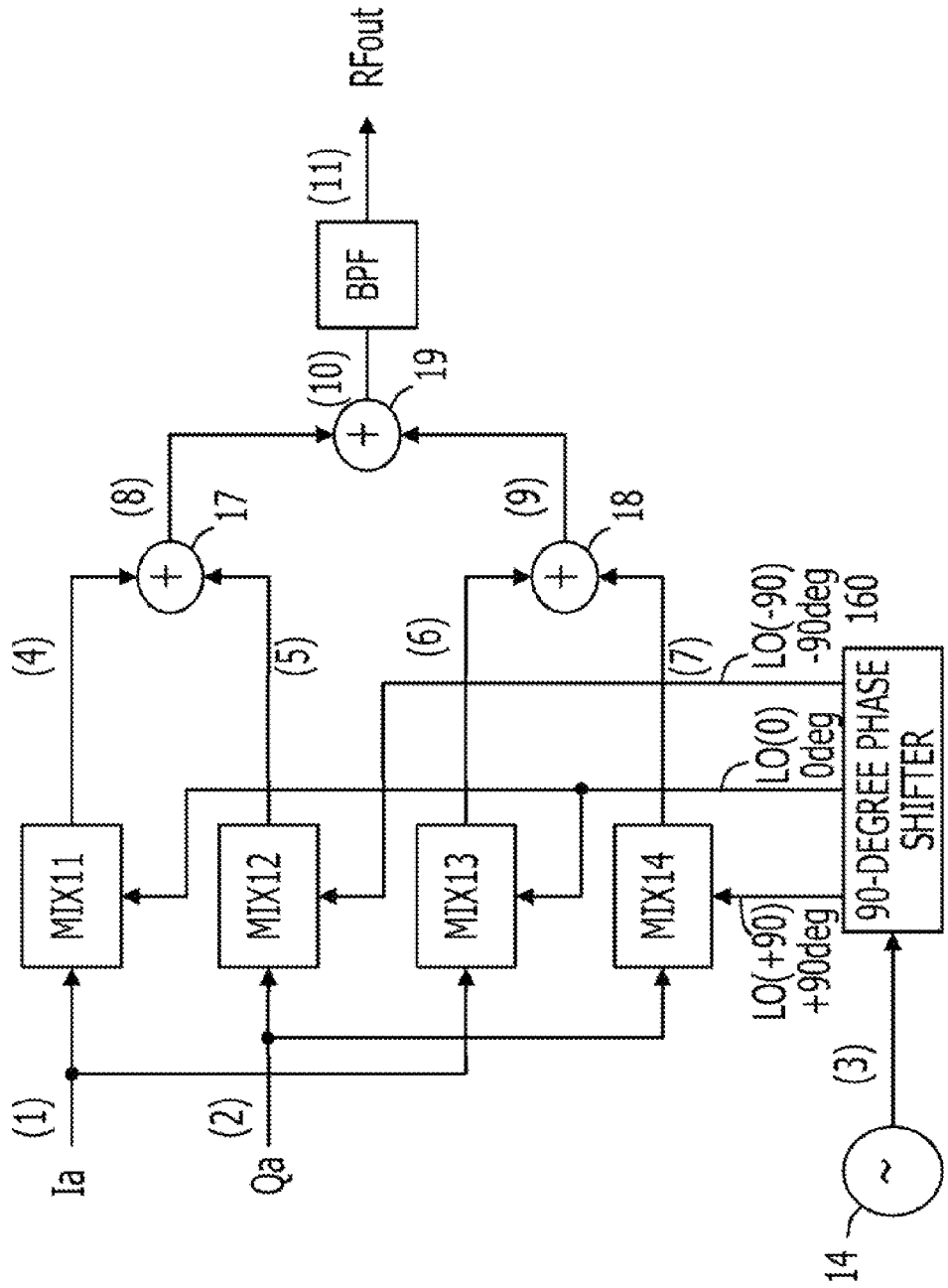
FIG. 11 illustrates an exemplary quadrature modulation circuit.

FIG. 11 illustrates an exemplary quadrature modulation circuit. A modulation signal output from the quadrature modulation circuit illustrated in FIG. 11 may not have a phase shift relative to 90 degrees even when a signal output from a phase shifter, which generates a local frequency signal, has a phase shift relative to 90 degree.

The quadrature modulation circuit includes first to fourth mixers MIX11 to MIX14, a phase shifter 160, and first to third adders 17, 18, and 19. A first input signal Ia is supplied to the first and third mixers MIX11 and MIX13. A second input signal Qa is supplied to the second and fourth mixers MIX12 and MIX14. The phase shifter 160 supplies a first local frequency signal LO(0) to the first and third mixers MIX11 and MIX13, supplies a second local frequency signal LO(−90)

having a certain phase difference relative to the first local frequency signal LO(0) to the second mixer MIX12, and supplies a third local frequency signal LO(+90) obtained by inverting the second local frequency signal LO(−90) to the fourth mixer MIX14. The first adder 17 adds signals output from the first and second mixers MIX11 and MIX12 to each other, the second adder 18 adds signals output from the third and fourth mixers MIX13 and MIX14 to each other, and the third adder 19 adds signals output from the first and second adders 17 and 18 to each other and outputs a modulation signal. The signal output from the third adder 19 is supplied to a bandpass filter BPF which outputs an RF frequency component.

A $\cos(\omega_{BB} t+\theta)$ may be input as an I-side input signal Ia(1). A $\cos(\omega_{BB} t+\theta-\pi/2)$ may be input as an input signal Qa(2). The ±90-degree phase shifter 160 may input $\cos(\omega_{LO} t)$ as a local frequency signal to the first and third mixers MIX11 and MIX13. The ±90-degree phase shifter 160 may input $\cos(\omega_{LO} t-\pi/2)$ to the second mixer MIX12 and $\cos(\omega_{LO} t+\pi/2)$ to the fourth mixer 14.

A signal (4) output from the first mixer MIX11 and a signal (6) output from the third mixer MIX13 are substantially equal to A $\cos(\omega_{BB} t+\theta) \times \cos(\omega_{LO} t)$. A signal (5) output from the second mixer MIX12 is substantially equal to A $\cos(\omega_{BB} t+\theta-\pi/2) \times \cos(\omega_{LO} t-\pi/2)$. A signal (7) output from the fourth mixer MIX14 is substantially equal to A $\cos(\omega_{BB} t+\theta-\pi/2) \times \cos(\omega_{LO} t+\pi/2)$. RF frequency components of the signals (4) and (6) output from the first and third mixers MIX11 and MIX13, respectively, are substantially equal to A/2×cos$((\omega_{BB}+\omega_{LO}) t+\theta)$. An RF frequency component of the signal (5) output from the second mixer MIX12 is substantially equal to A/2×cos$((\omega_{BB}+\omega_{LO}) t+\theta-\pi)$. An RF frequency component of the signal (7) output from the fourth mixer MIX14 is substantially equal to A/2×cos$((\omega_{BB}+\omega_{LO}) t+\theta)$.

As a result, a signal output from the bandpass filter BPF is represented as follows.

$$(4)+(5)+(6)+(7)=2\times A/2\times\cos((\omega_{BB}+\omega_{LO})t+\theta)+A/2\times\cos((\omega_{BB}+\omega_{LO})t+\theta-\pi)+A/2\times\cos((\omega_{BB}+\omega_{LO})t+\theta=2\times A/2\times\cos((\omega_{BB}+\omega_{LO})t+\theta)-A/2\times\cos((\omega_{BB}+\omega_{LO})t+\theta)+A/2\times\cos((\omega_{BB}+\omega_{LO})t+\theta)=A\times\cos((\omega_{BB}+\omega_{LO})t+\theta)$$

When a signal output from the ±90-degree phase shifter 160 has a phase shift of α, a +90-degree signal LO(+90) may correspond to $\cos(\omega_{LO} t+\pi/2+\alpha)$. A −90-degree signal LO(−90) may correspond to $\cos(\omega_{LO} t-\pi/2+\alpha)$. The RF frequency component of the signal (5) output from the second mixer MIX12 may correspond to A/2×cos$((\omega_{BB}+\omega_{LO}) t+\theta-\pi+\alpha)$. The RF frequency component of the signal (7) output from the fourth mixer MIX14 may correspond to A/2×cos$((\omega_{BB}+\omega_{LO})t+\theta+\alpha)$. An addition result, which is obtained by adding a signal (8) obtained by adding the signal (4) to the signal (5) and a signal (9) obtained by adding the signal (6) to the signal (7) to each other, is supplied to the bandpass filter BPF and an RF frequency component is extracted. The RF frequency component is represented as follows.

$$(4)+(5)+(6)+(7)=2\times A/2\times\cos((\omega_{BB}+\omega_{LO})t+\theta)+A/2\times\cos((\omega_{BB}+\omega_{LO})t\theta-\pi+\alpha)+A/2\times\cos((\omega_{BB}+\omega_{LO})t+\theta+\alpha)=t+\theta+\alpha)=A\times\cos((\omega_{BB}+\omega_{LO})t+\theta)$$

A phase shift of α of the ±90-degree phase shifter 160 may be cancelled, and a high-frequency modulation signal RFout may not have the phase shift of α.

The input signals Ia and Qa may be baseband signals or signals having intermediate frequencies. The modulation signal RFout may have a frequency higher than those of the input signals Ia and Qa by a local frequency of an oscillator 14.

The bandpass filter BPF, which passes high frequency components, may be disposed on output sides of the first to fourth mixers MIX11 to MIX14 or may be disposed on output sides of the first and second adders 17 and 18.

Figure 12:
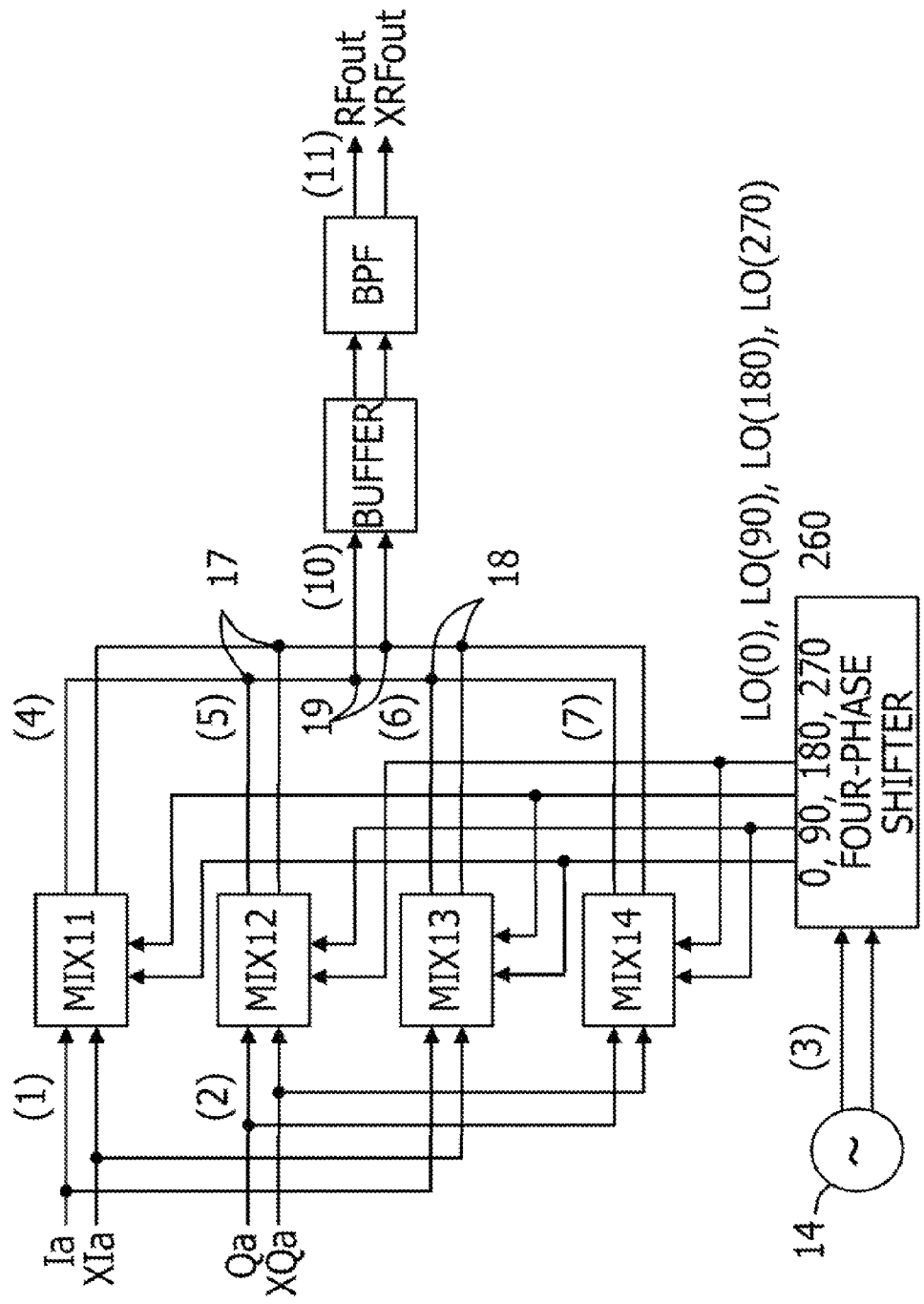
FIG. 12 illustrates an exemplary quadrature modulation circuit.

FIG. 12 illustrates an exemplary quadrature modulation circuit. The quadrature modulation circuit illustrated in FIG. 12 includes a differential circuit. First to fourth mixers MIX11 to MIX14 serving as multipliers include double balanced mixers. A four-phase shifter 260 generates a local frequency signal LO(0), LO(90), LO(180), or LO(270) having a phase difference of 0 degree, 90 degrees, 180 degrees, or 270 degrees. The four-phase shifter 260 may correspond to the divider circuit illustrated in FIG. 8.

The four-phase shifter 260 supplies the local frequency signal LO(0) having the phase difference of 0 degree or the local frequency signal LO(180) having the phase difference of 180 degrees to the first and third mixers MIX11 and MIX13. The four-phase shifter 260 supplies the local frequency signal LO(90) having the phase difference of 90 degrees or the local frequency signal LO(270) having the phase difference of 270 degrees to the second mixer MIX12. The four-phase shifter 260 supplies the local frequency signal LO(270) having the phase difference of 270 degrees or the local frequency signal LO(90) having the phase difference of 90 degrees to the third mixer MIX13. The four-phase shifter 260 outputs a synthesized signal obtained by synthesizing the signals output from the first to fourth mixers MIX11, MIX12, MIX13, and MIX14 with one another to a buffer. Thereafter, a bandpass filter BPF extracts high-frequency components. In this way, high-frequency differential modulation signals RFin and XRFin which have reduced phase errors of α may be generated. The first to third adders 17, 18, and 19 include wired ORs.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

The invention claimed is:
1. A quadrature demodulation circuit comprising:
first to fourth mixers to receive a modulation signal;
a phase shifter to supply to the first and third mixers a first local frequency signal, to supply to the second mixer a second local frequency signal having a designated phase difference relative to the first local frequency signal, and to supply to the fourth mixer a third local frequency signal that is an inverse in phase to the second local frequency signal;
a first adder to add a signal output from the first mixer and a signal output from the second mixer and to output a first demodulation signal; and
a second adder to add a signal output from the third mixer and a signal output from the fourth mixer and to output a second demodulation signal.
2. The quadrature demodulation circuit according to claim 1 further comprising:
a first gain varying circuit to control a gain of a signal output from the first adder; and
a second gain varying circuit to control a gain of a signal output from the second adder.
3. The quadrature demodulation circuit according to claim 1,
wherein the phase shifter performs control such that a phase difference between the second local frequency signal and the first local frequency signal becomes substantially −90 degrees and a phase difference between the third local frequency signal and the first local frequency signal becomes substantially +90 degrees.

4. The quadrature demodulation circuit according to claim 1 further comprising:
one or more low-pass filters which receives a signal output from one or more of the first to fourth mixers, respectively.

5. The quadrature demodulation circuit according to claim 1 further comprising:
one or more low-pass filters which receives a signal output from one or more of the first and second adders, respectively.

6. The quadrature demodulation circuit according to claim 1,
wherein each of the modulation signal, the first local frequency signal, the second local frequency signal, the third local frequency signal, the first demodulation signal, and the second demodulation signal includes differential signals.

7. The quadrature demodulation circuit according to claim 3,
wherein the phase difference between the first and second local frequency signals includes a margin of error.

8. The quadrature demodulation circuit according to claim 3,
wherein the phase difference between the first and third local frequency signals includes a margin of error.

9. A quadrature modulation circuit comprising:
first to fourth mixers, wherein the first and third mixers to receive a first input signal, and the second and fourth mixers to receive a second input signal;
a phase shifter to supply to the first and third mixers a first local frequency signal, to supply to the second mixer a second local frequency signal having a designated phase difference relative to the first local frequency signal, and to supply to the fourth mixer a third local frequency signal that is an inverse in phase to the second local frequency signal; and
an adder to add signals output from the first to fourth mixers and outputs a modulation signal based on the added signals.

10. The quadrature modulation circuit according to claim 9,
wherein the phase shifter performs control such that a phase difference between the second local frequency signal and the third local frequency signal becomes substantially −90 degrees and a phase difference between the third local frequency signal and the first local frequency signal becomes substantially +90 degrees.

11. The quadrature modulation circuit according to claim 9 further comprising:
a buffer which receives signals output from the first to fourth mixers respectively.

12. The quadrature modulation circuit according to claim 9 further comprising:
a bandpass filter which receives a signal output from the adders.

13. The quadrature modulation circuit according to claim 9,
wherein each of the first input signal, the second input signal, the first local frequency signal, the third local frequency signal, and the modulation signal includes differential signals.

14. The quadrature modulation circuit according to claim 13,
wherein the phase difference between the first and second local frequency signals includes a margin of error.

15. The quadrature demodulation circuit according to claim 13,
wherein the phase difference between the first and third local frequency signals includes a margin of error.

16. A method for demodulating a modulation signal, comprising:
mixing the modulation signal with a first local frequency signal to generate a first mixed signal and a second mixed signal;
mixing the modulation signal with a second local frequency signal to generate a third mixed signal, the second local frequency signal having a designated phase difference relative to the first local frequency signal;
mixing the modulation signal with a third local frequency signal to generate a fourth mixed signal, the third local frequency signal is an inverse in phase to the second local frequency signal;
adding the first mixed signal and the third mixed signal together to output a first demodulation signal; and
adding the second mixed signal and the fourth mixed signal together to output a second demodulation signal.

17. The method for demodulating of claim 16, wherein:
the phase difference between the first and second local frequency signals includes a margin of error; and
the phase difference between the first and third local frequency signals include the margin of error.

18. A method for modulating input signals, comprising:
mixing a first input signal with a first local frequency signal to generate a first mixed signal and a second mixed signal;
mixing a second input signal with a second local frequency signal to generate a third mixed signal, the second local frequency signal having a designated phase difference relative to the first local frequency signal;
mixing the second input signal with a third local frequency signal to generate a fourth mixed signal, the third local frequency signal is an inverse in phase to the second frequency signal; and
adding the first to fourth mixed signals together to generate a modulation signal.

19. The method for modulating input signals of claim 18, wherein:
the phase difference between the first and second local frequency signals includes a margin of error; and
the phase difference between the first and third local frequency signals include the margin of error.

* * * * *